(12) United States Patent
Petit et al.

(10) Patent No.: US 9,079,516 B2
(45) Date of Patent: Jul. 14, 2015

(54) FRAME FOR A MOTOR VEHICLE SEAT CUSHION

(75) Inventors: Jean-Noël Petit, Saint Maurice sur Fessard (FR); Patrice Courtois, Sermaise (FR); Farouk Bouzid, Bretigny sur Orge (FR); Claude Duboulet, Etrechy (FR)

(73) Assignee: FAURECIA SIEGES D'AUTOMOBILE, Nanterre (FR)

( * ) Notice: Subject to any disclaimer, the term of this patent is extended or adjusted under 35 U.S.C. 154(b) by 121 days.

(21) Appl. No.: 13/339,623

(22) Filed: Dec. 29, 2011

(65) Prior Publication Data
US 2012/0169095 A1  Jul. 5, 2012

(30) Foreign Application Priority Data
Dec. 30, 2010 (FR) ...................... 10 61368

(51) Int. Cl.
*B60R 7/04* (2006.01)
*B60N 2/30* (2006.01)
*B60R 5/00* (2006.01)

(52) U.S. Cl.
CPC ................ *B60N 2/305* (2013.01); *B60R 5/006* (2013.01); *B60R 7/043* (2013.01)

(58) Field of Classification Search
CPC ............................... B60N 2/305; B60R 7/043
USPC ........... 297/188.1, 188.09, 188.21, 335, 331, 297/188.02, 188.08, 188.2
See application file for complete search history.

(56) References Cited

U.S. PATENT DOCUMENTS

| 56,535 | A | * | 7/1866 | Doughty ........................ 15/265 |
| 562,241 | A | * | 6/1896 | Reese et al. ................. 297/188.1 |
| 938,832 | A | * | 11/1909 | Dozier ............................. 297/59 |
| 3,206,775 | A | * | 9/1965 | Filson ............................... 5/118 |
| 3,964,786 | A | * | 6/1976 | Mashuda ...................... 297/330 |
| 4,389,070 | A | * | 6/1983 | Chien .......................... 297/365 |
| 4,637,652 | A | * | 1/1987 | Bergenwall .......... 297/DIG. 10 |
| 4,838,612 | A | * | 6/1989 | Cross ........................... 297/338 |
| 4,867,506 | A | * | 9/1989 | Chavez ...................... 297/188.2 |
| 4,938,533 | A | * | 7/1990 | Thielois ........................ 297/337 |
| 5,584,530 | A | * | 12/1996 | Rogers et al. ............. 297/188.1 |
| 5,588,663 | A | * | 12/1996 | Rundle et al. ............. 280/304.1 |
| 5,622,404 | A | * | 4/1997 | Menne ....................... 297/188.1 |
| 5,957,521 | A | * | 9/1999 | Schlachter ................. 296/37.15 |
| 5,984,397 | A | * | 11/1999 | Dawson et al. ........... 296/65.09 |
| 6,264,260 | B1 | * | 7/2001 | Kronner et al. ........... 296/37.15 |
| 6,412,870 | B1 | * | 7/2002 | Higgins et al. ............... 297/342 |
| 6,460,922 | B1 | * | 10/2002 | Demick .......................... 297/14 |
| 6,561,583 | B2 | * | 5/2003 | Glaser .......................... 297/325 |

(Continued)

FOREIGN PATENT DOCUMENTS

| FR | 2818205 A1 | 6/2002 |
| FR | 2886594 A1 | 12/2006 |

(Continued)

OTHER PUBLICATIONS

Search Report issued in FR10/61368 on Oct. 12, 2011.

*Primary Examiner* — Peter Brown
(74) *Attorney, Agent, or Firm* — Vedder Price, P.C.

(57) ABSTRACT

A cushion structure for a motor vehicle seat including a retractable stop piece capable of preventing an object placed under the cushion from moving towards the front, and means capable of arranging said cushion in a position preventing a passenger from sitting on it.

9 Claims, 4 Drawing Sheets

(56) References Cited

U.S. PATENT DOCUMENTS

| | | | |
|---|---|---|---|
| 6,692,069 B2* | 2/2004 | Beroth et al. | 297/118 |
| 6,742,841 B1* | 6/2004 | Soditch et al. | 297/335 |
| 6,752,443 B1* | 6/2004 | Thompson et al. | 296/24.34 |
| 7,086,696 B2* | 8/2006 | Yudovich | 297/335 |
| 7,195,302 B2* | 3/2007 | Jovicevic | 296/65.01 |
| 7,311,356 B2* | 12/2007 | Pudney | 297/188.01 |
| 7,494,182 B2* | 2/2009 | Westendorf et al. | 297/284.2 |
| 7,901,005 B2* | 3/2011 | Khan et al. | 297/331 |
| 7,938,482 B1* | 5/2011 | Ludwig et al. | 296/216.07 |
| 7,938,485 B1* | 5/2011 | Perciballi et al. | 297/216.1 |
| 7,976,093 B2* | 7/2011 | McBride | 296/65.05 |
| 8,002,350 B2* | 8/2011 | Johnson | 297/248 |
| 8,287,024 B2* | 10/2012 | Sayama | 296/65.03 |
| 2004/0032155 A1* | 2/2004 | Yamada et al. | 297/331 |
| 2004/0155994 A1* | 8/2004 | Saito et al. | 349/61 |
| 2004/0212237 A1* | 10/2004 | Epaud et al. | 297/331 |
| 2006/0061152 A1* | 3/2006 | Pudney | 297/188.01 |
| 2008/0061606 A1* | 3/2008 | Skelly et al. | 297/188.1 |
| 2009/0121523 A1* | 5/2009 | Johnson | 297/140 |
| 2012/0038189 A1* | 2/2012 | McConnell et al. | 297/182 |

FOREIGN PATENT DOCUMENTS

| | | |
|---|---|---|
| FR | 2914597 A1 | 10/2008 |
| GB | 2384464 A | 7/2003 |

* cited by examiner

FRAME FOR A MOTOR VEHICLE SEAT CUSHION

BACKGROUND OF THE INVENTION

1. Field of the Invention

The present invention relates to motor vehicle seats and, more specifically, to a seat cushion structure.

2. Discussion of Prior Art

FIG. 1 is a simplified view of a motor vehicle seat 1 of the type to which the present invention applies. Seat 1 comprises a cushion 2 and a backrest 3. Cushion 2 is supported by a frame, not shown in FIG. 1. A passenger 5 is seated on the cushion, which has a substantially horizontal upper surface. The passenger's feet rest on floor 4 of the motor vehicle. There is a free volume 6 under cushion 2 between cushion 2 and floor 4.

SUMMARY OF THE INVENTION

An object of an embodiment of the present invention is to provide a motor vehicle seat cushion structure overcoming all or part of the disadvantages of known frames.

Another object of an embodiment of the present invention is to provide a structure enabling to securely use the free volume under the cushion.

Another object of an embodiment of the present invention is to provide a structure enabling to place an object under the cushion without for it to be able to slip towards the front of the seat and injure the passenger of the seat.

Another object of an embodiment of the present invention is to provide a structure enabling to slide a long load under the cushion, protruding from the cushion towards the front, such a configuration forbidding the use of the seat cushion by a passenger for security reasons.

Thus, an embodiment of the present invention provides a cushion structure for a motor vehicle seat, comprising:

a retractable stop piece capable of preventing an object placed under the cushion from moving to the front; and
  means capable of placing said cushion in a position preventing a passenger from sitting on it.

According to an embodiment of the present invention, said means are connected to said stop piece.

According to an embodiment of the present invention, the stop piece is an arch.

According to an embodiment of the present invention, the stop piece can pivot around a front crosspiece between an approximately vertical position and an approximately horizontal position.

According to an embodiment of the present invention, the stop piece in approximately vertical position is capable of preventing objects located under the cushion from slipping to the front.

According to an embodiment of the present invention, the stop piece in approximately horizontal position is retracted and clears the way under the cushion to enable to slide loads under the cushion.

According to an embodiment of the present invention, said means comprise a cam capable of raising the cushion when said stop piece is retracted.

According to an embodiment of the present invention, the cam is attached to the stop piece and pivots along an axis collinear to the front crosspiece.

According to an embodiment of the present invention, said means comprise a cushion frame in approximately vertical position when the stop piece is in retracted position.

According to an embodiment of the present invention, the cushion frame and the retractable stop piece pivot around an axis collinear to the front crosspiece.

The present invention also provides a motor vehicle seat comprising such a cushion structure.

The foregoing and other objects, features, and advantages of the present invention will be discussed in detail in the following non-limiting description of specific embodiments in connection with the accompanying drawings.

DETAILED DESCRIPTION

Figure 1:
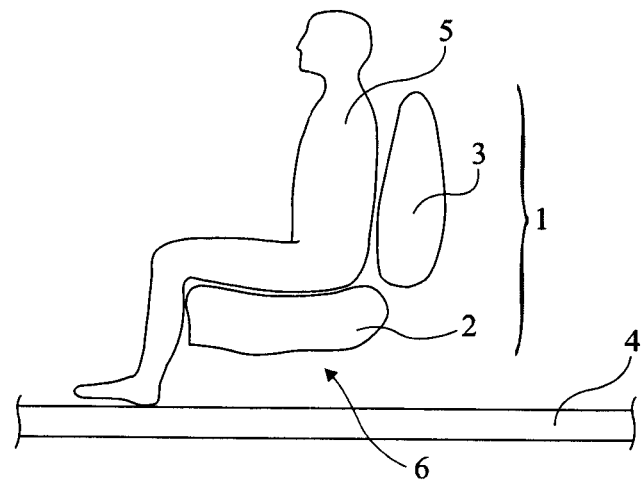
FIG. 1, previously described, is a view of a motor vehicle seat of the type to which the present invention applies.

For clarity, the same elements have been designated with the same reference numerals in the different drawings, which have been drawn out of scale. Further, position terms "high", "low", "vertical", and "horizontal", "higher", "lower", "front", "back", etc. should be understood with respect to a position of the seat in a motor vehicle. Further, only those elements which are useful to the understanding of the present invention have been shown and will be described. In particular, the forming of cushionings or paddings has not been detailed, the present invention being compatible with usual paddings. Finally, the present invention is described in relation with a back seat for two passengers of a motor vehicle. The present invention can easily be transposed to any type of front or back seat for motor vehicles.

Figure 2A:
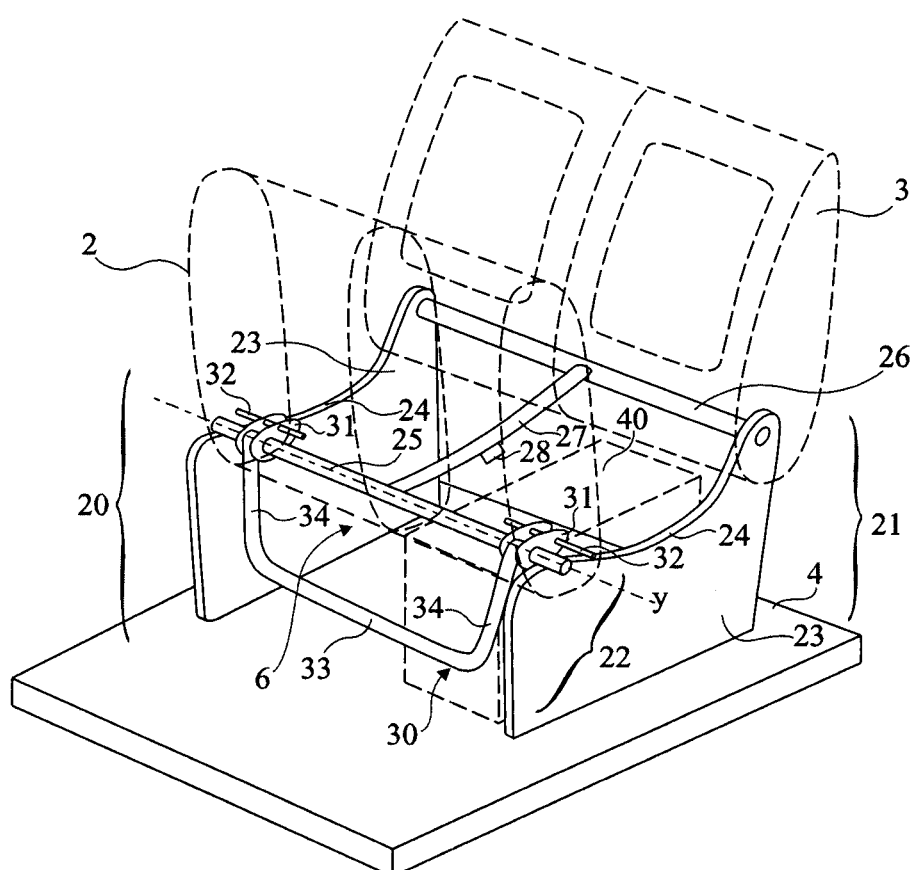
FIGS. 2A, 2B, and 2C are perspective views illustrating an embodiment of a seat cushion structure.
Figure 2B:
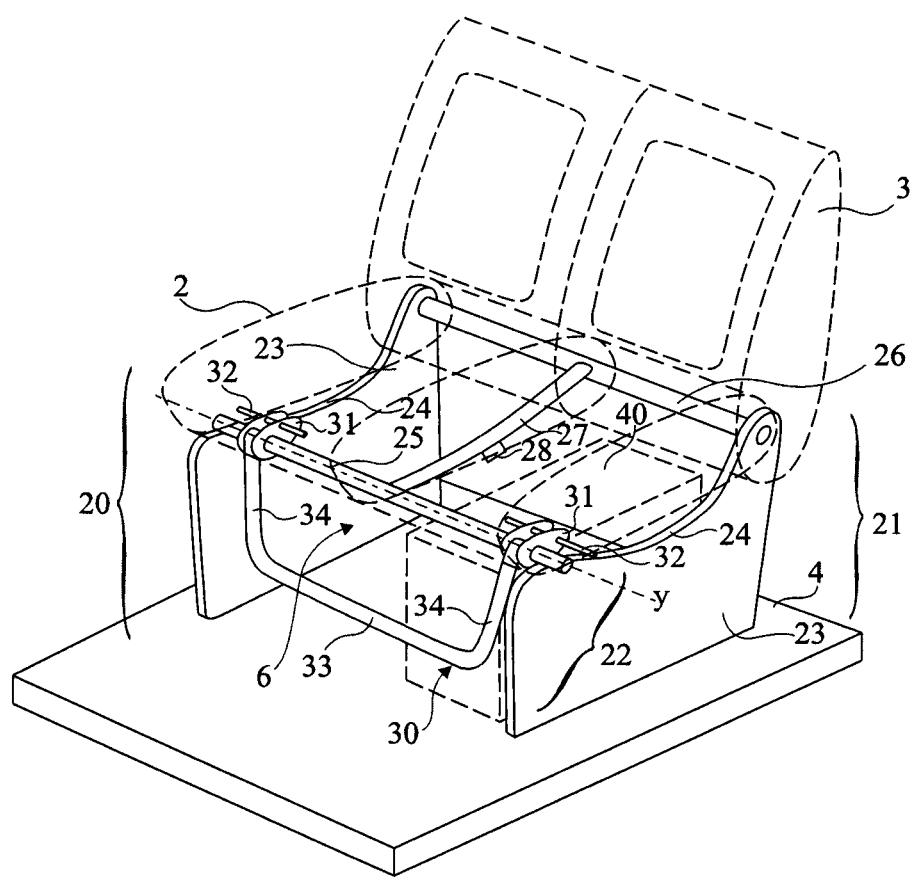
Figure 2C:
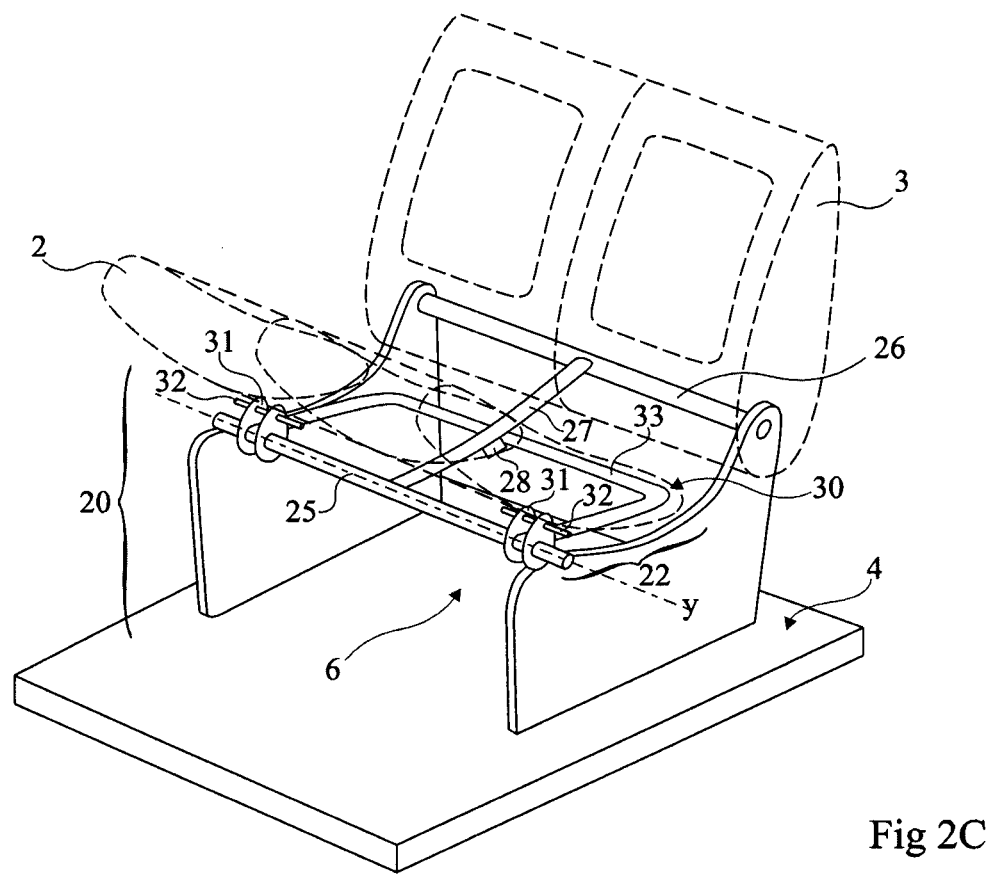

FIGS. 2A, 2B, 2C, and 3 show a seat for two passengers according to an embodiment. To better show a cushion structure 20, cushion 2 and backrest 3 have been shown in dotted lines. FIGS. 2A to 2C are perspective views in different positions of the cushion.

Cushion structure 20 is formed of a non-deformable frame 21 and of a security system 22 rotatable around a transverse axis Y.

Frame 21 comprises two vertical side plates 23 longitudinally located on each side of the cushion. Upper surface 24 of side plates 23 is substantially planar and horizontal. Further, horizontal front and back crosspieces 25 and 26 connect the upper portions of side plates 23. A median strengthening beam 27 connects the middles of the two crosspieces 25 and 26. Median crosspiece 27 comprises a downward-facing hook 28. Side plates 23 are attached to floor 4 of the motor vehicle either directly, or via rails as usual for motor vehicle seat cushions. Preferably, the surface of floor 4 is planar and has neither hollows nor bumps.

Mobile security system 22 comprises a stop piece 30, for example having the shape of a U-shaped arch, on which is attached at least one cam 31 comprising a horizontal pin 32. The stop piece is for example formed of a crosspiece 33 extending at each end in a vertical branch 34. The free ends of branches 34 are jointed to crosspiece 25 along axis Y. Cam 31 is flat and elongated. Cam 31 is attached by a first end to the free end of a branch 34, substantially perpendicularly to the plane of stop piece 30. For symmetry reasons, a second cam 31 may be attached to the free end of second branch 34. In this case, cams 31 are location on the same side of the plane of stop piece 30. Pin 32, for example, cylindrical, is attached to the second end of cam 31, parallel to crosspiece 33.

Stop piece 30 is rotatably assembled around axis Y so that, when the arch is in vertical position with crosspiece 33 located under front crosspiece 25 of the cushion, the second end of cam 31 supporting pin 32 is directed towards the back of frame 20. In this position, pin 32 is in contact with upper surface 24 of side plate 23 at the back of rotation axis Y. As a result, stop piece 30, located under rotation axis Y, cannot pivot towards the front when pin 32 bears on upper surface 24 of side plate 23 at the back of pivoting axis Y. Stop piece 30 thus prevents any body from moving from the back to the front, for example, a parcel 40 slipping on the seat due to a braking.

FIG. 2A shows a first position of cushion 2 illustrating a first operating mode in which, when stop piece 30 is in vertical position, it is possible to raise cushion 2 of the seat vertically (approximate 90° angle with respect to the horizontal direction) to engage an object 40 from the top into free volume 6 previously described in relation with FIG. 1.

FIG. 2B shows the seat with cushion 2 folded back. Object 40 cannot slip towards the front since it is held back by stop piece 30. After having folded back cushion 2, a passenger can comfortably and safely sit on cushion 2 of seat 1. As a variation, object 40 may be engaged from the back of the seat.

In the case where the vertical bulk of the object is too large, cushion 2 cannot be fully folded and becomes impossible to use.

FIG. 2C illustrates a second operating mode of security system 22. Stop piece 30 is brought, by rotation of security system 22 around axis Y, to a substantially horizontal position above median beam 27. Preferably, crosspiece 33 of stop piece 30 is snapped on lock 28 to maintain the horizontal position of stop piece 30. Stop piece 30 is thus retracted and free volume 6 is opened towards the front.

Figure 3:
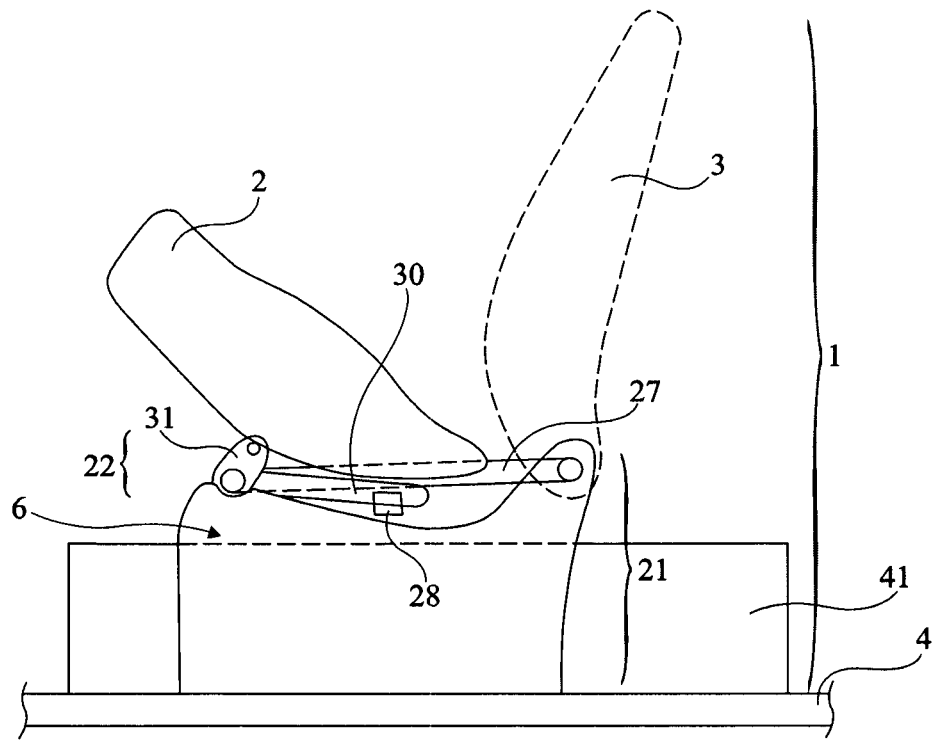
FIG. 3 is a side view of the structure of FIG. 2C.

FIG. 3 is a side view of the seat in the configuration of FIG. 2C better showing the cooperation of cushion 2 with the security system. Stop piece 30 of security system 22 is horizontal and snapped on lock 28 of median beam 27. Free volume 6 is accessible from the front. Long loads 41 may for example be slid under seat 1 on floor 4 and protrude on the front or on the back. By rotation of security system 22, the second end of cam 31 is directed upwards and lifts up the bottom of cushion 2, which can no longer be horizontally positioned. Cushion 2 is thus made uncomfortable and useless for the passengers. This prevents a passenger from sitting in an unsafe position (knees up) when a load is present.

In practice, the user must raise cushion 2 to enable the security system to be retracted and allow the passing of load 41. Once the load is in place, cushion 2 can no longer take back its horizontal position.

In the above embodiment, the cushion can take a horizontal position in safe use mode (FIG. 2B) or have an angle, preferably ranging between 17° (FIGS. 2C and 3) and 90° (FIG. 2A) with respect to the horizontal direction, preventing a passenger form sitting on it.

Figure 4A:
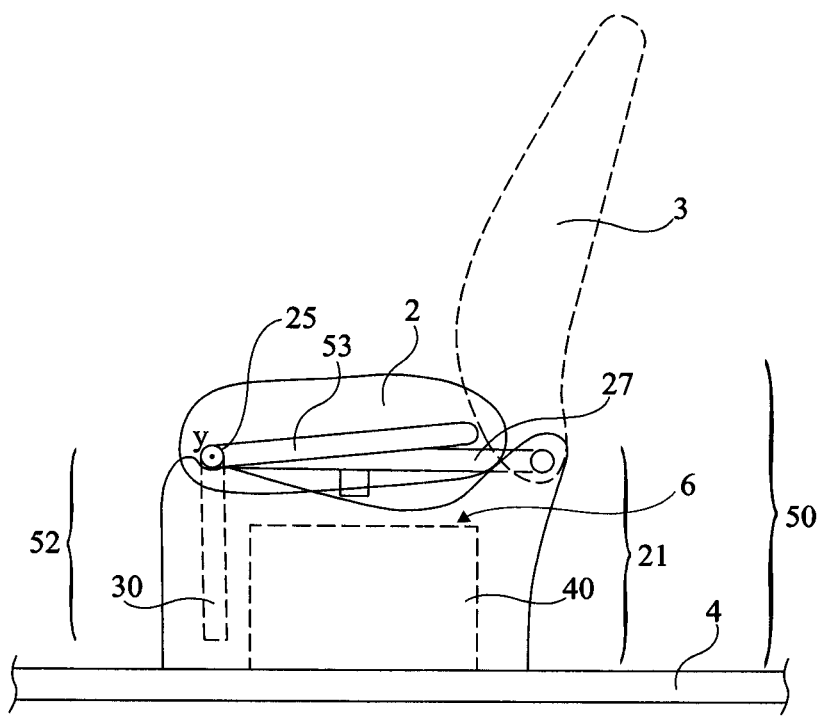
FIGS. 4A and 4B are side views of another embodiment of a cushion structure.
Figure 4B:
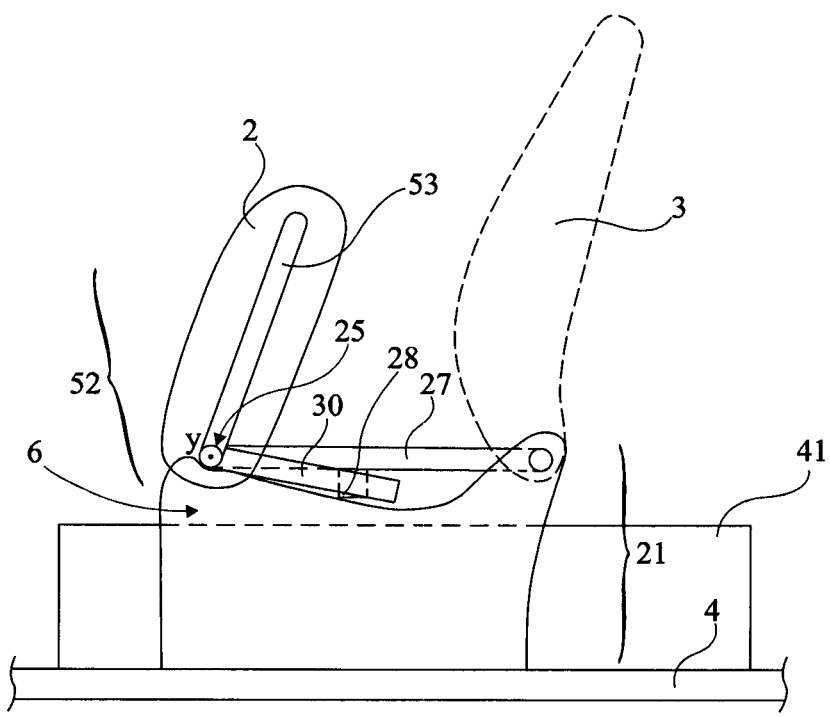

FIGS. 4A and 4B are side views of a seat 1 illustrating another embodiment of a cushion structure 50.

Cushion structure 50 is formed of non-deformable frame 21 previously described in relation with FIGS. 2A to 2C and of a mobile security system 52 rotating around this frame 21.

Security system 52 comprises, as in the example previously described in relation with FIGS. 2A to 2C, a retractable stop piece 30 and pivotal connections enabling security system 52 to rotate around axis Y collinear with the axis of front crosspiece 25. A cushion frame 53, for example, in the shape of an arch, is attached to stop piece 30. Cushion frame 53 forms a fixed angle, approximately straight, with stop piece 30, and is located above and in contact with median strengthening beam 27 when stop piece 30 is in vertical position under front crosspiece 25.

Thus, security system 52 and cushion 2 may rotate around axis Y between two limiting positions.

FIG. 4A illustrates a first position in which stop piece 30 is vertical, under front crosspiece 25, and cushion support 53 is then horizontal and in contact with the top of beam 27. In this limiting position, stop piece 30 blocks any load placed under the seat (for example, engaged from the trunk) and prevents it from moving forwards. Cushion 2 may be used safely and comfortably by a passenger.

FIG. 4B illustrates a second position of security system 52 in which stop piece 30 is brought, by rotation of security system 52 around axis Y, in substantially horizontal position under median beam 27. As described in relation with FIG. 3, stop piece 30 is, for example, snapped on lock 28 of median beam 27. In this second position, stop piece 30 is retracted. Free volume 6 is open towards the front. Long load 41 can then be slid on floor 4 under seat 1 and protrude on the front or the back of seat 1. By rotation of security system 52, cushion 2 driven by its armature 53 is substantially vertical and impossible to use. The passenger's safety is thus guaranteed.

In the described embodiments, for simplicity, stop piece 30 or support 53 have been described in the form of planar arches. All other shapes may be envisaged on the condition that they provide the same respective stop or cushion frame functions and that they can rotate around axis Y. Similarly, cam 31 may have various shapes, and may have protrusions capable of raising the seat cushion or an intermediate support of the seat cushion. In vertical position, stop piece 30 may be submitted to significant forces originating from trunk 40 to be held. Such forces are transmitted especially to the pin close to rotation axis Y. It will be within the abilities of those skilled in the art to select the materials and the geometric dimensions of security system 22 so that the developed forces are absorbed with no deformation or breakage of the security system. Specific embodiments of the present invention have been described. Various alterations and modifications will occur to those skilled in the art. In particular, the materials used have not been described. It will be within the abilities of those skilled in the art to select them according to the weight, implementation, and resistance constraints. It should be noted that those skilled in the art may combine various elements of the various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A cushion structure for a motor vehicle seat, comprising:
   rotatable means having a first position in which a cushion, operatively connected to the rotatable means, is positioned to permit a passenger to sit on the cushion, and further having a second position in which the cushion is positioned to prevent the passenger from sitting on the cushion; and
   a stop piece operatively connected to the rotatable means to be in an approximately vertical position when the rotatable means is in the first position and to be in an approximately horizontal position when the rotatable means is in the second position, wherein the stop piece, in the vertical position, prevents an object placed under the seat from moving in front of the seat, and wherein the stop piece is substantially below a level of the cushion in both the vertical position and the horizontal position.

2. The cushion structure of claim 1, wherein the stop piece is an arch.

3. The cushion structure of claim 1, wherein the stop piece can pivot around a front crosspiece between the approximately vertical position and the approximately horizontal position.

4. The cushion structure of claim 1, wherein said rotatable means comprise a cam.

5. The cushion structure of claim 4, wherein the cam is attached to the stop piece and pivots along an axis collinear to a front crosspiece.

6. The cushion structure of claim 1, wherein said rotatable means comprise a cushion frame in approximately vertical position when the rotatable means is in the second position.

7. The cushion structure of claim 6, wherein the cushion frame and the stop piece pivot around an axis collinear to a front crosspiece.

8. A vehicle seat comprising the cushion structure of claim 1.

9. The cushion structure of claim 1, wherein rotation of the cushion causes movement of the stop piece, via said rotatable means, between the approximately horizontal position and the approximately vertical position and vice versa.

* * * * *